Patented Apr. 3, 1934

1,953,263

UNITED STATES PATENT OFFICE 1,953,263

MERCURY COMPOUND OF NITRO-ORTHO-CRESOLS

George W. Raiziss, Philadelphia, Pa., assignor to Abbott Laboratories, North Chicago, Ill., a corporation of Illinois No Drawing. Application June 21, 1932, Serial No. 618,565

3 Claims. (Cl. 260—13)

My invention relates to certain new compounds which have been found to be especially effective as bactericidal and bacteriostatic agents, particularly in combating infectious diseases, and relates more particularly to mercury compounds of nitro-cresols.

In my Patent No. 1,554,293, granted September 22, 1925, there is described diacetoxy-mercuri-4-nitro-ortho-cresol. Upon discovery that the compound produced as described in said patent did not in fact conform to said formula, this patent was reissued as No. 17,563, dated January 14, 1930. In my Patent No. 1,630,072, granted May 24, 1927, there are described certain mercury derivatives of 3-nitro-ortho-cresol. All of these derivatives were found to have excellent properties as bactericides. However, my continued research has developed the fact that other isomeric mercury derivatives of nitro-ortho-cresols may likewise be prepared and that such substances also are highly effective as bactericides.

These new nitro-cresol derivatives differ from each other, sometimes to a considerable extent, in their physical, chemical and bacteriological properties, and may be represented by the typical formula:

R.HgX for the mono-mercury derivatives, and

R.(HgX)$_2$ for the di-mercury derivatives, wherein R represents 5-nitro-ortho-cresol and X represents an acetoxy group, CH$_3$COO—, a halogen, a hydroxy group —OH, or, when a molecule of water is removed from the latter, an anhydro-hydroxy group —O—.

In preparing these new products, I mercurate any of the isomers of a nitro-ortho-cresol and produce first an acetoxy-mercuri compound. This is then converted into an anhydro-hydroxy-mercuri derivative according to the following reactions:

C$_6$H$_3$—CH$_3$—NO$_2$—OH+Hg(OOC—CH$_3$)$_2$→
 C$_6$H$_2$—CH$_3$—NO$_2$—OH—Hg—COO—CH$_3$+CH$_3$COOH

C$_6$H$_2$—CH$_3$—NO$_2$—OH—Hg—COO—CH$_3$+NaOH→
 C$_6$H$_2$—CH$_3$—NO$_2$—O—Hg+CH$_3$—COONa+H$_2$O

The hydroxy mercury derivatives are preferably formed as alkali metal salts, in alkaline solution, as follows:

C$_6$H$_2$—CH$_3$—NO$_2$—OH—HgCOOCH$_3$+2NaOH→
 C$_6$H$_2$CH$_3$—NO$_2$—ONa—HgOH+CH$_3$—COONa+H$_2$O.

The halogen derivatives may be formed by treating either the acetoxy or anhydro-hydroxy derivatives with a halide acid, thus:

C$_6$H$_2$—CH$_3$—NO$_2$—ONa—HgOH+2HCl→
 C$_6$H$_2$—CH$_3$—NO$_2$—OH—HgCl+NaCl+H$_2$O.

The following examples illustrate my invention:

Example

Using 5-nitro-ortho-cresol prepared by nitration of ortho cresol in benzene using dilute nitric acid (Berichte—40,4319), I prepared by the above described method acetoxy-mercuri-5-nitro-ortho-cresol:

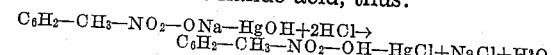

consisting of white silky needles, decomposing at 275° C., and anhydro-hydroxy-mercuri-5-nitro-ortho-cresol:

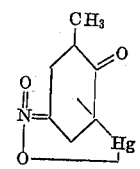

The latter product consists of cream colored, minute needles, insoluble in water, soluble in dilute alkalies, producing a bright yellow solution in a dilution of 1:500.

The foregoing example will suggest various other modifications of the same general method to a person skilled in the art.

The halide-mercuri and hydroxy-mercuri compounds are prepared as indicated by the above reactions.

The compounds described above are usually dispensed in the form of their sodium salts in aqueous solution, the preparation of which will be obvious to those skilled in the art.

Changes and variations coming within the spirit of my invention will doubtless suggest themselves to those skilled in the art. Hence, I do not wish to be limited to the specific embodiments disclosed herein or uses mentioned, except to the extent set forth in the appended claims, which are to be interpreted as broadly as the state of the art will permit.

The nomenclature used in defining the above compounds is that employed in the inventor's Reissue Patent No. 17,563, a reissue of Patent No.

1,554,293, wherein the production of mercuri-4-nitro-ortho-cresol is disclosed, said nomenclature being that used in the 3d edition of Beilstein.

I claim as my invention:

1. A compound which may be represented by the formula:

$$R(HgX)_n$$

wherein R is the nucleus of

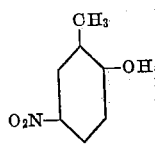

X is acetoxy, a halogen, hydroxy or anhydrohydroxy, and $n$ represents a whole number not greater than 2.

2. A substance which may be represented by the structural formula:

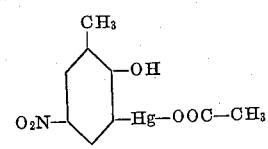

3. A substance which may be represented by the structural formula:

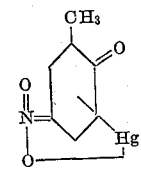

GEORGE W. RAIZISS.

CERTIFICATE OF CORRECTION.

Patent No. 1,953,263. April 3, 1934.

GEORGE W. RAIZISS.

It is hereby certified that error appears in the printed specification of the above numbered patent requiring correction as follows: Page 1, line 56, after "acetoxy" insert the word hydroxy; and that the said Letters Patent should be read with this correction therein that the same may conform to the record of the case in the Patent Office.

Signed and sealed this 15th day of May, A. D. 1934.

Bryan M. Battey (Seal) Acting Commissioner of Patents.